United States Patent [19]

Maeda et al.

[11] Patent Number: 5,737,588
[45] Date of Patent: Apr. 7, 1998

[54] DRIVING CIRCUIT FOR A MICROCOMPUTER THAT ENABLES SLEEP CONTROL USING A SMALL-SCALE TIMER

[75] Inventors: Kouichi Maeda, Anjou; Hideaki Ishihara, Okazaki; Akihiro Sasaki, Anjou, all of Japan

[73] Assignee: Nippondenso Co., Ltd., Kariya, Japan

[21] Appl. No.: 499,174

[22] Filed: Jul. 7, 1995

[30] Foreign Application Priority Data

Jul. 7, 1994 [JP] Japan .................. 6-156202
May 19, 1995 [JP] Japan .................. 7-121437

[51] Int. Cl.$^6$ .................................................. G06F 1/04
[52] U.S. Cl. .................. 395/555; 395/559; 395/560; 395/750
[58] Field of Search .................. 395/750, 555, 395/556, 559, 560

[56] References Cited

U.S. PATENT DOCUMENTS

| | | | |
|---|---|---|---|
| 4,758,945 | 7/1988 | Remedi | 364/200 |
| 5,083,266 | 1/1992 | Watanabe | 395/560 |
| 5,167,024 | 11/1992 | Smith et al. | 395/750 |
| 5,390,350 | 2/1995 | Chung et al. | 395/750 |

FOREIGN PATENT DOCUMENTS

| | | | |
|---|---|---|---|
| 61-177524 | 8/1986 | Japan | G06F 1/04 |
| 62-70923 | 4/1987 | Japan | G06F 1/04 |
| 4-34611 | 2/1992 | Japan | G06F 1/04 |
| 4171513 | 6/1992 | Japan | G06F 1/08 |
| 4348410 | 12/1992 | Japan | G06F 1/04 |
| 5-88775 | 4/1993 | Japan | G06F 1/04 |

Primary Examiner—Dennis M. Butler
Attorney, Agent, or Firm—Cushman, Darby & Cushman IP Group of Pillsbury Madison & Sutro LLP

[57] ABSTRACT

For a system which receives a sleep command to terminate the application of machine clock signals to a microprocessor and which clocks control execution time and stabilization time after the return from sleep control and resumes the supply of the machine clock signal, the clocking device for each of the time durations is implemented using a small-scale timing device. Following a sleep command from a microprocessor, sleep control, which terminates the operation of the main oscillator and the machine clock generation circuit that generates the machine clock signal based on the oscillation of the main oscillator, is started. Then, counting the oscillation signal from an RC oscillator used for clocking using an RC timer, the lapse time after starting sleep control is started and if the clocked time reaches a predetermined time, the main oscillator is reactivated. After reactivating the main oscillator, the RC timer is reset so that it begins to count the time thereafter starting from "0" and if the clocked time reaches the time needed for the oscillation of the main oscillator to stabilize, the machine clock generation circuit resumes its operations.

16 Claims, 7 Drawing Sheets

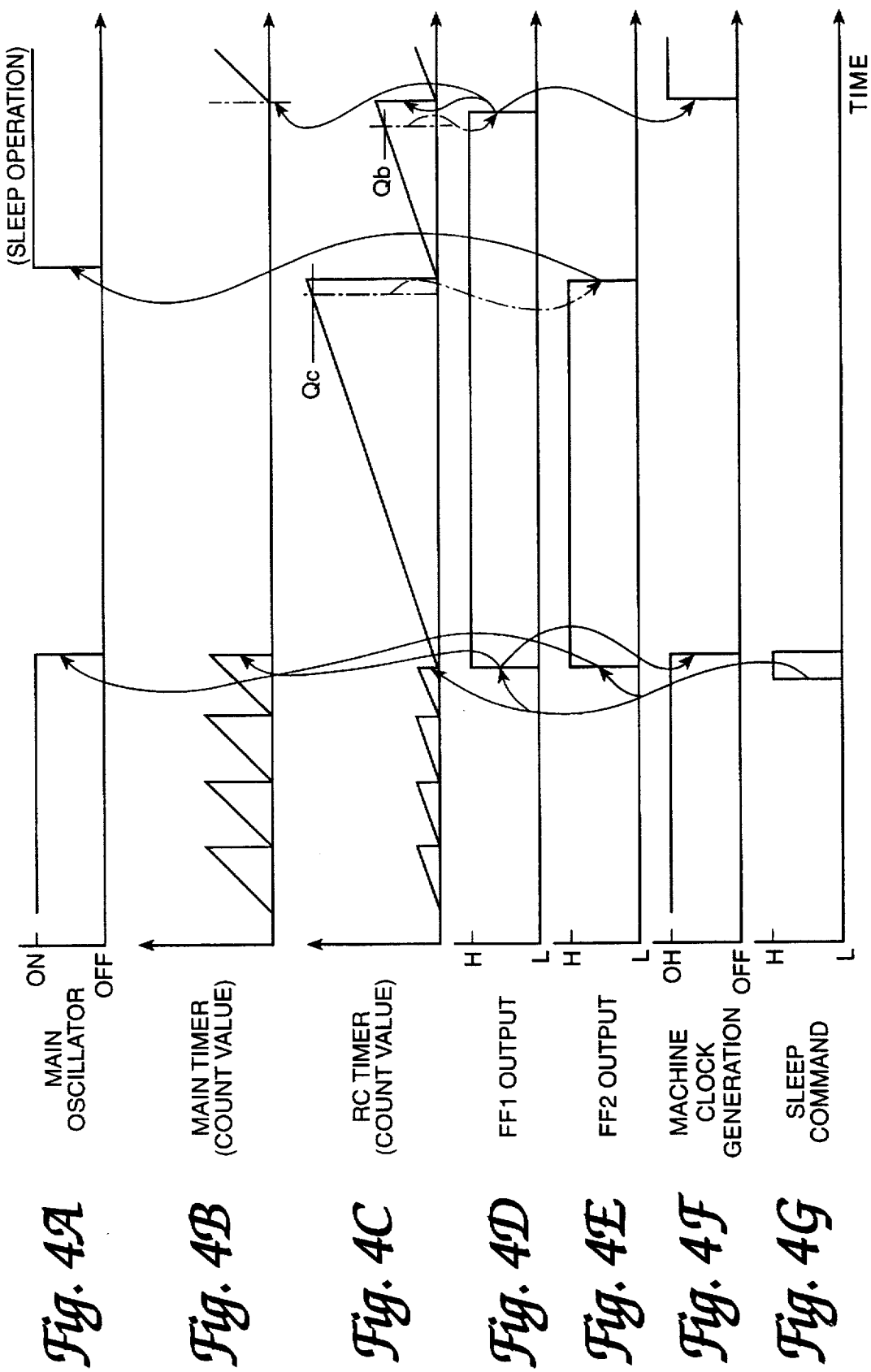

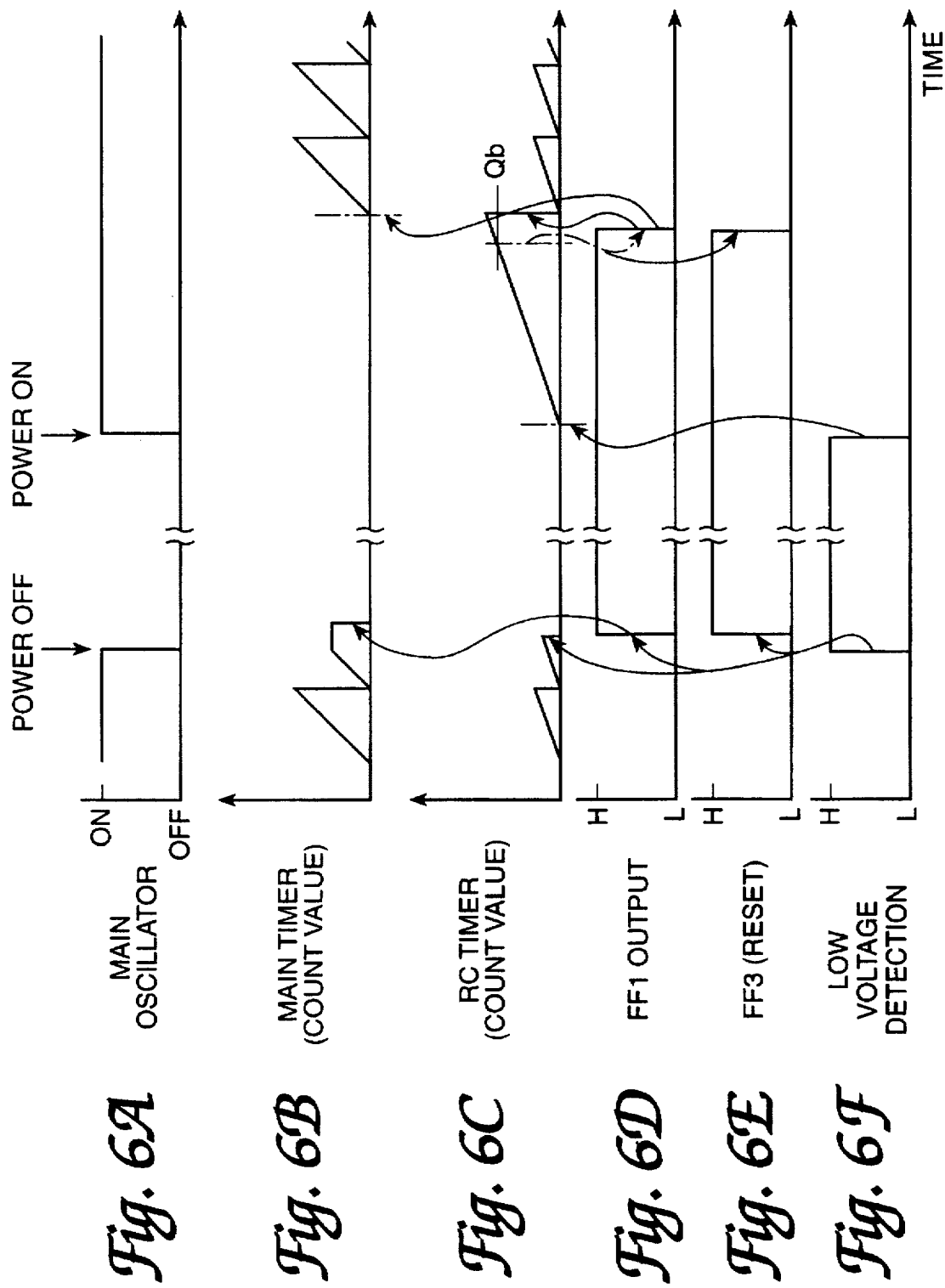

1

DRIVING CIRCUIT FOR A MICROCOMPUTER THAT ENABLES SLEEP CONTROL USING A SMALL-SCALE TIMER

CROSS-REFERENCE TO RELATED APPLICATION

This application is related to and claims priority from Japanese Patent Application No. Hei-6-156202, the contents of which are hereby incorporated by reference.

BACKGROUND OF THE INVENTION

1. Field of the Invention

This invention concerns a driving circuit for controlling the operations of a microprocessor by generating the necessary machine clock and reset signals for microprocessor operation and resetting.

2. Description of Related art

In the past, a driving circuit for a microprocessor generates machine clocks based on oscillation signals from oscillators which use oscillating elements like quartz crystals and the like in order to provide high-precision machine clocks for microprocessors. Also, the driving circuit provides reset signals for the microprocessor after detecting whether the electric power is switched on because there is a need to initialize registers, RAM and the like inside the microprocessor when electric power is applied thereto.

Also, there are circuits of this type which reduce power consumption of microprocessors by terminating the oscillation of the oscillator and stopping the supply of the machine clock signal to the microprocessor, operations which are commonly known as sleep control, during the termination of the processing operations of the microprocessor.

Meanwhile, while these circuits which perform sleep control usually execute sleep control operations that terminate oscillations of the oscillator when a microprocessor generates a sleep control execution command ("sleep command") after determining the conditions for sleep command execution have been satisfied, there have been problems because restoration after sleep control is performed when an external release command is received through external switch operations of the user or the like. For example, the object being controlled by the microprocessor continues operating until the release command of the sleep control is received because of errors due to noise or the like, the microprocessor generated the sleep command while the driving switch of the object is on, etc.

One proposal to deal with this problem, as disclosed in Japanese Patent Laid-Open Publication No. 4-348410, involves clocking the execution time of the sleep control using a timer circuit (counter) that uses as its clocking signal an oscillation signal from a secondary oscillator provided separately from the main oscillator which generates machine clock signals, activating the main oscillator after the measured time reaches a predetermined time and, after the main oscillator is activated, delaying the machine clock output using a delay circuit until the oscillation of the main oscillator stabilizes.

According to the circuit of this proposal, because the duration of the sleep control is limited by the predetermined time measured by the timer circuit, high-speed restoration to the normal state is achieved even if the object of control operates erroneously during sleep control execution. However, because the delay circuit that delays machine clock outputs after the activation of the main oscillator computes the logical AND of each bit output of the timer circuit, there were problems of having large timer circuits. In other words, for this proposed circuit, the size of the timer circuit for clocking increases because the time for the oscillation to stabilize after lifting sleep control is also being measured in addition to sleep control execution time (the time for terminating the main oscillator).

Also, while machine clock outputs are delayed from the time the main oscillator is activated until the time its oscillation stabilizes to prevent erroneous operations in the microprocessor due to the instability of the machine clock signal, this delay control of the output of the machine clock should not only be performed when resuming operations after sleep control but also immediately after the main oscillator starts oscillating after switching electric power on. However, for this above-proposed circuit, a separate timer that clocks the time it takes for the oscillation of the main oscillator to stabilize after applying electric power and that delays the machine clock output must be provided. In this way, if delaying the output of the machine clock output after applying electric power is also considered, then enlargement in the size of the timer circuit becomes a problem.

On the other hand, since an oscillator that utilizes an oscillating element made of quartz or the like is used usually as the main oscillator for generating the machine clock, a highly accurate machine clock having a stable frequency is provided for the microprocessor. However, during the operation of the microprocessor, when faults in the oscillator and defects in the installation of the oscillating element cause termination in the oscillation of the oscillator, supply of the machine clock to the microprocessor also stops, e.g., the oscillation of the oscillator stops while the microprocessor leaves the driving switch on for the object being controlled, and thus, it is likely that the microprocessor will not be able to terminate the operation of the object being controlled.

SUMMARY OF THE INVENTION

In consideration of these problems, the present invention aims to simplify a clocking device for measuring the sleep control time and stabilization time when resuming operations after sleep control for a driving circuit that supplies machine clock and reset signals to a microprocessor and controls the operations of the microprocessor and, furthermore, the present invention aims to prevent erroneous operations of an object being controlled by the microprocessor.

To achieve these aims, a first aspect of the present invention provides a driving circuit for a microprocessor which includes a main oscillation device that generates an oscillation signal for forming a machine clock signal, a machine clock generation device that generates a machine clock signal based on the oscillation signal from the main oscillation device and supplies said signal to the microprocessor, a secondary oscillation device separate from the main oscillation device that generates an oscillation signal for clocking, a main sleep control device which terminates the main oscillation device through a sleep command received from the microprocessor, a machine clock sleep device that terminates the machine clock signals from the machine clock generation device through the sleep command, a clocking device that clocks, based on the oscillation signal generated by the secondary oscillation device, the lapse time after the main sleep control device terminates the main oscillation device and starts reclocking after resetting when the clocked time reaches a predetermined time, a main sleep control termination device that activates the main oscillation device after lifting the oscillation termination command imposed on the same after clocked time of the clocking device has reached a main sleep release time and a machine clock sleep termination device that activates the machine clock generation device after releasing the machine clock output termination command imposed on the machine clock generation device when the clocked time after the clocking device restarted clocking after the activation of the main oscillation device by the main sleep control termination device reaches a machine clock sleep release time needed for the oscillation of the main oscillation device to stabilize.

In this way, the machine clock generation device operates the microprocessor by generating a machine clock signal and supplying this machine clock to the microprocessor based on the oscillation signal from the main oscillation device.

In addition, the driving circuit of the present invention is provided with a secondary oscillation device, separate from the main oscillation device, that generates an oscillation signal for clocking and if the microprocessor generates a sleep command, the main sleep control device terminates the oscillation of the main oscillation device at the same time the machine clock sleep control device terminates the machine clock outputs from the machine clock generation device with the clocking device clocking the lapse time after these based on the oscillation signal from the secondary oscillation device.

Then, if the time clocked by the clocking device reaches a main sleep release time, the main sleep control termination device lifts the oscillation termination command imposed by the main sleep control device on the main oscillation device and activates the main oscillation device.

In addition, the clocking device resets if the clocked time reaches a main sleep release time and restarts clocking after the main oscillation device is activated. Then, if the clocked time reaches a machine clock sleep release time, the machine clock sleep control termination device lifts the machine clock output termination command imposed by the machine clock sleep control device on the machine clock generation device and activates the machine clock generation device.

In other words, in the present invention, the sleep command from the microprocessor starts the sleep control that terminates the operations of the main oscillation and machine clock generation devices and if a main sleep release time elapses, the main oscillation device is activated and if a machine clock sleep release time elapses, the machine clock generation device is activated and the supply of the machine clock to the microprocessor is started.

In this way, according to the present invention, the main oscillation device is reliably activated after a main sleep release time has lapsed even after the sleep command from the microprocessor has started the sleep control. For example, even if the object being controlled by the actuator driven by the microprocessor erroneously operates because of noise or the like or even if execution conditions for sleep control are established and sleep control is started while the driving switch of the object being controlled by the microprocessor is on, the microprocessor can be operated and the irregular operation of the object of control terminated even after the main oscillation device has been activated or moreover, even after a machine clock sleep release time expires. Thus, the use of a microprocessor as the controlling device for driving the object of control improves reliability.

Also, because the machine clock generation device generates the machine clock after a machine clock sleep release time needed for the oscillation of the main oscillation device to stabilize after activation lapses, stable machine signals are always received and thus, the reliability of the microprocessor's driving circuit improves.

Furthermore, for the present invention, the main sleep control termination device lifts the oscillation termination command imposed on the main oscillation device and at the same time, resets the clocking device. With the clocking of the clocking device restarted, the machine clock sleep release time needed for the oscillation of the main oscillation device to stabilize after oscillation start is clocked. Therefore, there is no need for the clocking device to clock the machine clock sleep release time after clocking the main sleep release time and thus, there is no need to enlarge the clocking device.

In other words, according to the present invention, there is no need to provide a clocking device of a size that can continuously clock the main sleep release and machine clock sleep release times as in the conventional circuit. That is, if the main sleep release time is longer than the machine clock sleep release time, the clocking device is so sized for measuring the machine clock release time. Conversely, the clocking device is sized to measure the machine clock release time if the machine clock sleep release time is longer than the main sleep release time. Thus, the clocking device can be miniaturized compared to the conventional device.

Meanwhile, if the clocking device resets and clocks the machine clock sleep release time, then if the machine clock sleep release time is shorter than the main sleep release time, then the clocked time first reaches the machine clock sleep time and thus, the machine clock generating device is first released from the sleep control.

Therefore, in the driving circuit of the present invention, the machine clock sleep control termination device releases the machine clock termination on the machine clock generation device only after the activation of the main oscillation device after sleep control and after detecting that the clocked time of the clocking device has reached a machine clock sleep release time.

Accordingly, if the machine clock sleep release time is shorter than the main sleep release time, then after starting sleep control, the release of the machine clock generation device from sleep control ahead of the main oscillation device is prevented.

Also, according to a second aspect of the present invention, a driving circuit of the microprocessor includes a machine clock sleep control termination device that has a detection device for detecting whether the main oscillation device was reactivated by the main sleep control termination device and if the clocked time after the clocking device restarted clocking has reached a machine clock sleep release time.

On the other hand, in a third aspect of the present invention, a driving circuit for a microprocessor includes a main oscillation device that generates an oscillation signal for forming a machine clock, a machine clock generation device that generates a machine clock based on the oscillation signal from the main oscillation device and supplies the signal to the microprocessor, a secondary oscillation device separate from the main oscillation device that generates an oscillation signal for clocking, a main sleep control device which terminates the oscillation of the main oscillation device through a sleep command received from the microprocessor, a machine clock sleep device that terminates the machine clock outputs from the machine clock generation device through the sleep command, a clocking device that clocks, based on the oscillation signal from the secondary oscillation device, lapse time after the main oscillation device is terminated by the main sleep control device together with detecting if the main sleep control device terminated the main sleep oscillation device and starts reclocking after resetting when the clocked time passes a predetermined time, a main sleep control termination device that lifts the oscillation termination command on the main oscillation device after the clocked time of the clocking device has reached a main sleep release time and activates the main oscillation device and a machine clock sleep termination device that releases the machine clock output termination command on the machine clock generation device and activates the machine clock generation device when the clocked time after the clocking device restarted clocking has reached a machine clock sleep release time needed for the oscillation of the main oscillation device to stabilize.

Meanwhile, for the clocking device in the first and second aspects of the present invention, if the machine clock sleep release time is longer than the main sleep release time, then the clocked time of the clocking device first reaches the main sleep release time, the device resets and begins clocking again until it reaches the main sleep release time again before reaching the machine clock sleep release time and thus, the clocking device is reset again and thus, the clocking device cannot clock up to the machine clock sleep release time.

Then, according to this aspect of the present invention, the clocking device is so constructed that it restarts clocking based on the oscillation signal from the secondary oscillation device after detecting the oscillation termination command on the main sleep control device and resets after the clocked time has reached the main sleep release time.

In this way, according to this aspect of the present invention, after the clocking device resets and restarts clocking, the clocking device is not reset even if the clocked time reaches the main sleep release time because the oscillation termination command from the main sleep control device has been released and therefore, if the machine clock sleep release time is longer than the main sleep release time, nothing prevents the clocking device from clocking up to the machine clock sleep release time.

Also, in another further aspect of the present invention, a driving circuit for a microprocessor includes an electric power supply state detection device that resets the clocking device after detecting that electric power is being supplied and an operation termination device which terminates the operations of the microprocessor by terminating the machine clock outputs from the machine clock generation device or generating a reset signal during a time interval from the activation of the oscillation device by supplying electric power up to the time when the clocked time of the clocking device reaches a machine clock sleep release time.

According to this aspect of the present invention, the electric power supply state detection device detects electric power supply, resets the clocking device and operates the microprocessor by either terminating the machine clock output from the machine clock generation device or by generating a reset signal during the activation of the main oscillation device with the microprocessor is switched on up to the time the clocked time of the clocking device reaches a machine clock sleep release time.

In short, in this aspect of the present invention, because it takes time for the oscillation signal generated by the main oscillation device to stabilize after activation, terminating operations of the microprocessor during a time interval from the commencement of the oscillation operation of the main oscillation device after receiving electric power up to the stabilization of the oscillation signal of the main oscillation device prevents the operation of the microprocessor with unstable machine clock signals.

As a result, according to this aspect of the present invention, the microprocessor is operated with stable machine clock signals after switching electric power on and thus the reliability of the processing operations of the microprocessor improves.

Also, since the clocking device is reset after supplying electric power and starts clocking immediately after switching the electric power on, clocking the time for the oscillation of the main oscillation device to stabilize is performed in the same way as the clocking of the machine clock sleep release time after releasing sleep control using the clocking device for clocking the main sleep release and the machine clock sleep release times during sleep control and thus, there is no need to provide separate timers as clocking devices and the delay operation for stabilizing the machine clock after switching electric power on can be implemented with a simple construction.

In addition, in yet another aspect of the present invention, a driving circuit for a microprocessor includes a main oscillation irregularity determination device that determines for irregularities in the period of the oscillation signal from the main oscillation device based on the oscillation signal from the secondary oscillation device and a resetting device for resetting the microprocessor by generating a reset signal after determining through the main oscillation irregularity determination device that there is an irregularity in the oscillation signal from the main oscillation device.

According to this aspect of the present invention, the main oscillation irregularity determination device determines irregularities in the period of the oscillation signal from the main oscillation device using the oscillation signal from the secondary oscillation device. Then if an irregularity is found in the oscillation signal from the main oscillation device using this main oscillation irregularity determination device, the reset device resets the microprocessor by generating a reset signal.

In other words, irregularities in the period of the oscillation signal from the main oscillation device that occur during the termination or the like of the oscillation of the main oscillation device are determined using the oscillation signal from the secondary oscillation device and the microprocessor is reset if an irregularity is found.

In this way, for example, when the microprocessor is generating a predetermined signal, even if the main oscillation device stops oscillating and the machine clock signal cannot be supplied to the microprocessor from the machine clock generation device, the microprocessor is reset and said signal generation of the microprocessor is terminated.

Therefore, erroneous operations due to malfunctions of the main oscillation device, defects in the installation of the oscillation element or the like of the driving circuit that operates after receiving a signal from the microprocessor are prevented and thus the reliability of the output signal from the microprocessor improves. Also, if a microprocessor is a controlling device that controls and drives a motor's actuator, continuous operation of the actuator caused by malfunctions in the main oscillation device is prevented.

Moreover, in still another further aspect of the present invention, a driving circuit for a microprocessor includes a secondary oscillation device that is constructed from an RC oscillator.

In this aspect of the present invention, because the secondary oscillator is formed from an RC circuit and since such circuits are more reliable than oscillators which use quartz or the like as oscillating elements, sleep control reliability improves.

In particular, in the fourth aspect of the present invention, a stable oscillation signal can be supplied immediately after applying electric power because the oscillation of the secondary oscillation device stabilizes immediately after applying electric power. Therefore, the time it takes for the oscillation of the main oscillation device to stabilize after switching on electric power is always clocked accurately. Also, using the circuit according to the fifth aspect of the present invention, because the secondary oscillation device monitors the main oscillation device, highly-reliable monitoring is performed.

Also, in yet another aspect of the present invention, a driving circuit for a microprocessor includes an input terminal for providing an external sleep control release command and a main sleep control termination device that releases the oscillation termination command imposed on the main oscillation device by the main sleep control device and activates the main oscillation device also when the release command of the sleep control from the input terminal is received.

For the driving circuit of this aspect of the present invention, an input terminal is provided for receiving the external sleep control release command, and if the release command is entered from this input terminal, the termination command imposed by the main sleep control device on the main oscillation device is released and the main oscillation device is also activated.

Accordingly, in the same manner as the driving circuits of the first, second and third aspects of the present invention, the microprocessor receives the machine clock signal and resumes its operations not only when a predetermined time has lapsed after sleep control but also when the user performs switching operations or the like.

BRIEF DESCRIPTION OF THE DRAWINGS

Additional objects and advantages of the present invention will be more readily apparent from the following detailed description of preferred embodiments thereof when taken together with the accompanying drawings in which:

FIGS. 4A–4G are time charts that show the operations of the sleep/oscillation stabilization block according to the first embodiment during commencement and release of the sleep control;

FIGS. 6A–6F are time charts that show the operations of the sleep/oscillation stabilization block with the microprocessor according to the first embodiment when electric power is supplied and when electric power is cut off.

DETAILED DESCRIPTION OF THE PRESENTLY PREFERRED EXEMPLARY EMBODIMENTS

The preferred embodiments of this invention are explained below with the use of related figures.

Figure 2:
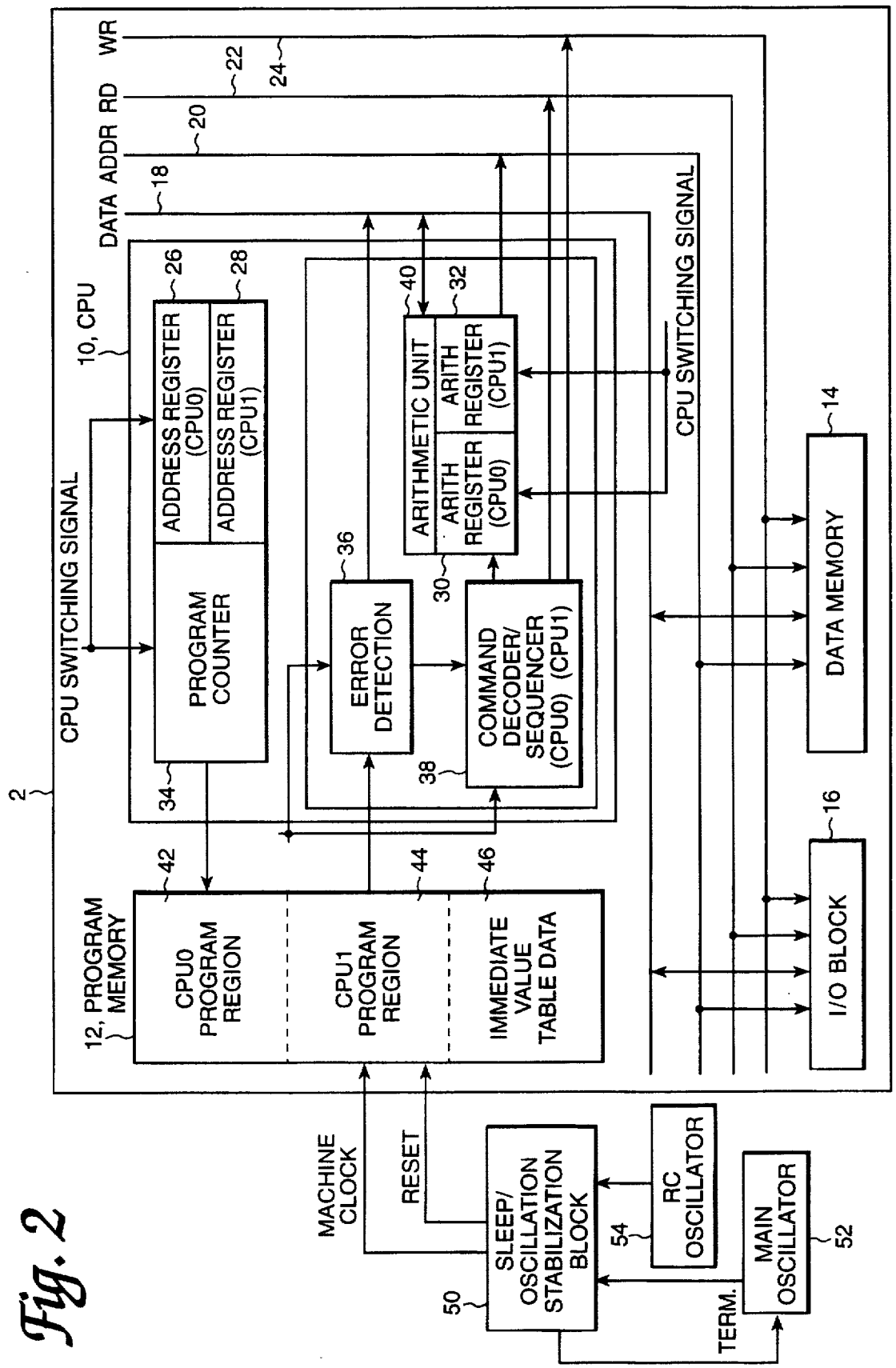
FIG. 2 is a block diagram that shows the overall construction of a single-chip microprocessor according to the first embodiment.

FIG. 2 is a block diagram that shows the overall construction of a single-chip microprocessor of a preferred embodiment of the present invention wherein a computer block 2 that constitutes a microprocessor, a sleep/oscillation stabilization block 50 that is the driving circuit of the present invention and which controls the operation of the computer block 2 by supplying machine clock and reset signals, a main oscillator 52 that generates the machine clock signal and an RC oscillator 54 are formed on the same base and molded using resins or the like.

As shown in FIG. 2, the computer block 2 includes a CPU 10, a program memory 12 constructed using ROM, a data memory 14 constructed using RAM, I/O block 16, a timing generator (not shown) that generates a CPU switching signal explained later, a data bus 18 for sending and receiving data, an address bus 20 for sending and receiving address signals, and control buses 22, 24 that send and receive read and write signals.

In addition, CPU 10 has two address registers 26, 28 and two arithmetic registers 30, 32 for time-shared parallel pipeline processing of two kinds of tasks (namely, A and L tasks) and by alternately switching address registers 26, 28 and arithmetic registers 30, 32 using a CPU switching signal generated by the timing generator (not shown), the CPU functions as if it is alternating between two CPUs.

For this embodiment, address register 26 and arithmetic register 30 are used for CPU0 (for the L task) while the other address register 28 and the other arithmetic register 32 are used for CPU1 (for the A task). The value of program counter 34 (the address of the next command to be fetched) is updated according to the switching of arithmetic registers 26, 28 and the address signals for CPU0 (for the L task) and CPU1 (for the A task) are provided alternately to program memory 12.

Also, the type of task the command read from program memory 12 belongs to is determined and an error detection circuit 36 for detecting errors in the command and a command decoder/sequencer 38 for decoding commands that have passed through the error detection circuit 36 are provided to decode the command and arithmetic operations in arithmetic unit 40 using arithmetic registers 30, 32 and to perform the command and read or write signals generated using the control buses 42, 44 in accordance with the decoded meaning of the command.

On the other hand, a program region 42 for CPU0 (for L tasks), a program region 44 for CPU1 (for A tasks) and an immediate value table data region 46 are provided in the program memory 12. L tasks stored in the program region 42 are constructed as fixed-loop programs that prohibit branching commands that can cause runaway programs. Because of this, during the execution of a program of the L task, the execution of the commands starts sequentially from the command of address 0 and proceeds sequentially to execute the commands of address 1, address 2, address 3, and so on until it reaches a predetermined address at which the program counter overflows and returns to address 0 and the execution of the commands is performed repeatedly in the above sequential manner. It must be noted here that the length of the L task is fixed at one word. The reason for this is that for command systems wherein the number of words of the command are not fixed (for example, command systems where there are one-word commands as well as two-word commands), if the two-word command is erroneously interpreted as a one-word command, there is no indication of what to execute next because the next word is not necessarily a command.

This L task is suitable for executing sequentially-controlled processes and includes in its program a routine for monitoring runaways in the A task which is the other task and a backup sequence routine for ensuring failsafeness. Furthermore this L task also functions as a timer using fixed loop operations. For example, fixed time processing equivalent to timer interruptions is implemented by generating interruptions in processing the A task equivalent when the counter value reaches a predetermined amount after executing increment or decrement commands.

On the other hand, the A task allows branching commands that are prohibited in L tasks and is suitable, for example, for executing complex analytical and numerical processes. In the same way as in the L task, all A task commands are limited to one word. The A and L tasks assign both the operation code and the operand to the same word.

Also, a task identification bit for identifying the type of task, for example, the MSB (uppermost bit), is provided for each command of CPU0 and CPU1 stored in the program memory 12. In the present embodiment, a parity bit is used as the task identification bit with the L task set to be of odd parity and the A task set to be of even parity. For this case, memory code checking is also performed aside from task identification. In response with this, the error detection circuit 36 described above identifies the type of task the command read from the program memory 12 belongs to using parity check, checks for errors in the command and determines if an unexpected influence such as noise or the like has caused the command of another task to be lined up for execution.

In other words, the error detection circuit 36 includes a task identification circuit, an error flag circuit, a no operation (NOP) code circuit, a pair of transfer gates of the low active and high active types and so on wherein the task identification circuit identifies the type of task the command read from the program memory 12 belongs to using parity check (that is, if the parity is even, then the command belongs to an L task; on the other hand, if the parity is odd, then the command belongs to an A task) and the identification result is compared with the CPU switching signal to determine if an error has occurred or not. If an error has occurred, an error flag circuit outputs an error signal (high-level signal) to the error flag circuit, resets the address register of the task where the error has occurred and at the same time, applies the error signal (high-level signal) to the control terminals of the pair of transfer gates to switch on the high-active type transfer gate and provides the signal of the NOP code from the NOP code circuit to the command decoder/sequencer 38 while preventing the passage of a command to the command decoder/sequencer 38. As a result, if an unexpected influence of noise or the like caused branching to the address of a different task and the lining up for execution the command in that address, NOP is set in only one command cycle and thus destruction of memory data, port data or the like is prevented. It must be noted here that if there is no error, the error detection circuit 36 keeps the output of the task identification circuit at a low level, turns off the high active type transfer gates, prevents the passage of the NOP code at the same time it turns on the low active type transfer gate and allows the passage of the command to the command decoder/sequencer 38.

In this way, with the one-chip microprocessor of this embodiment of the present invention, CPU 10 inside computer block 2 enables pipeline processing and appears to function as if it is alternately switching between two CPUs. Moreover, by fixing the length of all commands to one word and by assigning both operation code and operand in one word, problems that occur when commands are of multi-word construction, for example, runaway programs due to misinterpretation of the operation code and the operand, large-scale destruction of vital information inside the data memory as well as those problems that occur due to address errors, e.g., program address branching to the address of the immediate value data region 46 and commencing execution with the immediate value table data interpreted as the operation code leading to runaway programs and large scale destruction of vital information in the data memory, are prevented.

Figure 3:
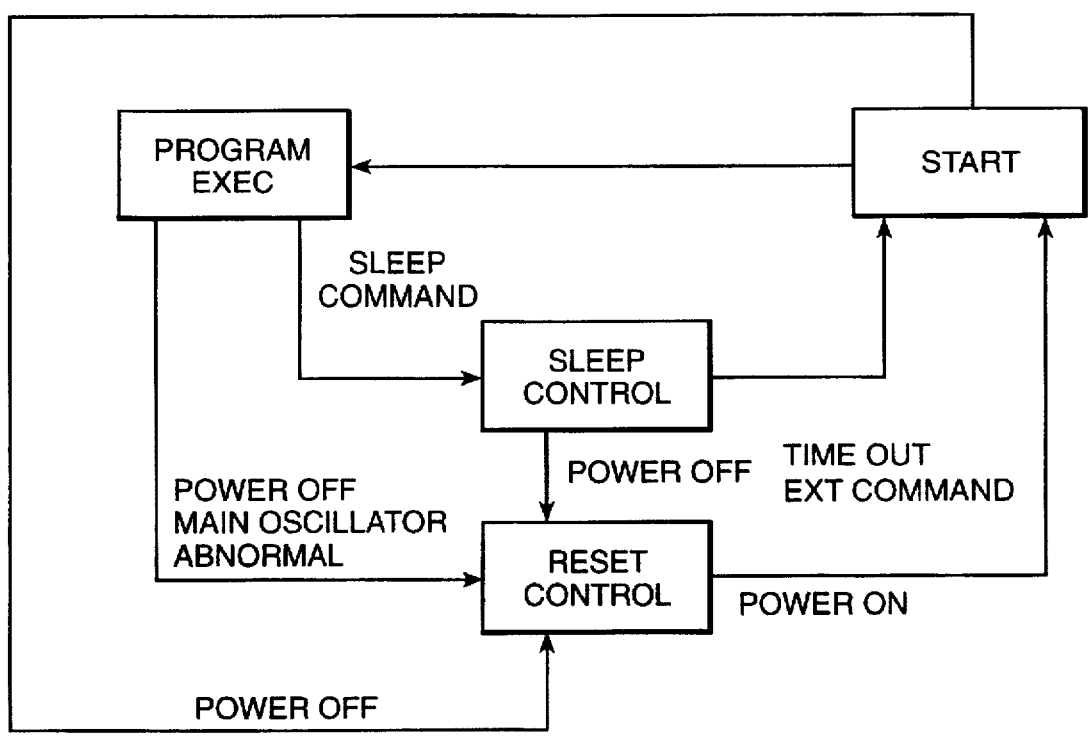
FIG. 3 is diagram that outlines the functions of the sleep/oscillation stabilization block according to the first embodiment.

On the other hand, for the above-constructed computer block 2, sleep/oscillation stabilization block 50 which acts as the driving circuit of this invention and supplies the machine clock and reset signals for operation receives the oscillation signals from the main oscillation block 52 and the RC oscillation block 54 and controls the computer block 2 describe above as shown in FIG. 3.

That is, because the sleep/oscillation stabilization block 50 continuously supplies the computer block 2 with a reset signal until the oscillation of the main oscillator 52 for generating the machine clock stabilizes after switching on the microprocessor, then the sleep/oscillation stabilization block 50 performs sleep control that prohibits the operation of the computer block 2 and after the termination of sleep control, the sleep/oscillation stabilization block controls the computer block 2 to a program execution state.

Also, if conditions are established for executing the sleep control while executing the program of computer block 2, then if a sleep command is entered from the computer block 2, the oscillation of the main oscillator 52 is terminated and sleep control that terminates the supply of the machine clock signal to the computer block 2 is performed. In addition, during the execution of sleep control, the main oscillator 52 resumes oscillation if a predetermined amount of time lapses (timeout) or a release command for the sleep control is received from the outside through the input terminal and start control that terminates the supply of the machine clock signal to the machine block 2 is performed until the oscillation of the main oscillator 52 stabilizes. After sleep control termination, the computer block 2 is switched to a program execution state.

On the other hand, during the program execution of computer block 2, a reset signal is supplied to computer block 2 to initialize the registers therein if electric power supply to the microprocessor is cut off (electric power off) or if the oscillation of the main oscillator 52 stops (oscillation irregularity).

The main oscillator 52 which supplies the machine clock signal to the sleep/oscillation stabilization block 50 uses dedicated oscillating elements made of quartz or the like welded afterwards to the microprocessor and which generates accurate oscillation signals that have stable frequencies, and together with the computer block 2, the main oscillator 52 receives electric power supplied from an outside electric power source to the microprocessor to performs its operations.

The RC oscillator 54 uses a resonance circuit composed of a resistor R and a capacitor C to generate oscillation signals and while the oscillation signal of RC oscillator 54 is not as accurate as that of the main oscillator 52, it does not use any dedicated oscillating element so it has few malfunctions and thus, it is a highly reliable oscillator. The RC oscillator 54 monitors the operations of the main oscillator 52, the execution time of sleep control 4, the time needed for the oscillation of the main oscillator 52 to stabilize after supplying electric power therein and the like. The period of oscillation of the RC oscillator 54 is set 10 times or more of the main oscillator 52 (that is, the frequency of the main oscillator 52 is ten times or more of the frequency of RC oscillator 54).

Next, the construction and operations of the sleep/oscillation stabilization block 50 described above which performs start, sleep and reset controls are explained.

Figure 1:
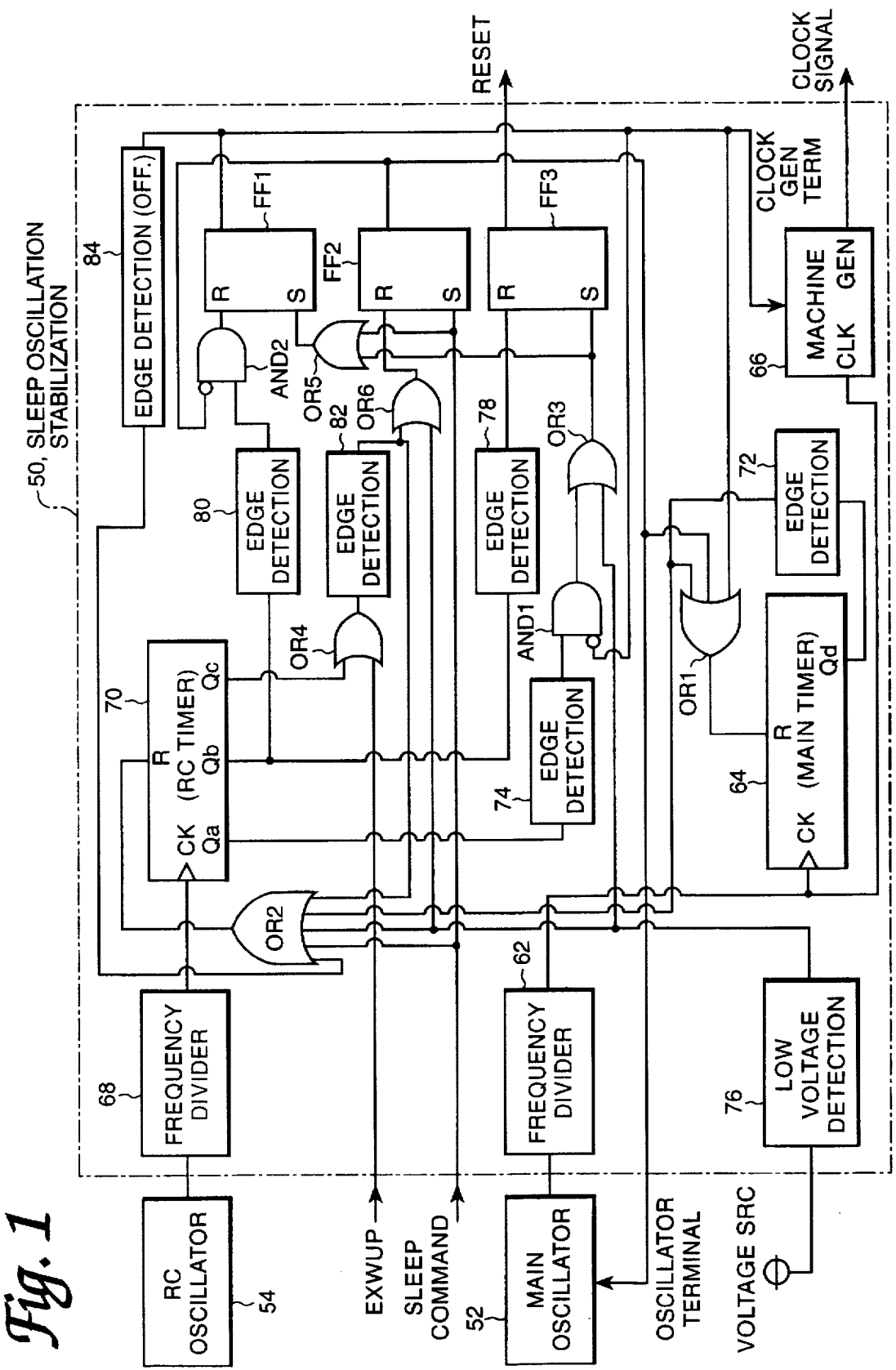
FIG. 1 is an electric circuit diagram that shows the construction of a sleep/oscillation stabilization block according to a first embodiment of the present invention.

FIG. 1 is an electric circuit diagram that shows the construction of the sleep/oscillation stabilization block 50.

As shown in FIG. 1, for the sleep/oscillation stabilization block 50, the oscillation signal from the main oscillator 50 is divided in half by frequency divider 62 and is applied to main timer 64 and the machine clock generation circuit 66 which acts as the machine clock generation device. In addition, the RC oscillator 54 inputs the oscillation signal to RC timer 70 after dividing it in half using frequency divider 68.

The main timer 64 is composed of a counter that counts the oscillation signal from the main oscillator 52 that has passed through the voltage divider 62, and if the counted value reaches a predetermined amount, the main timer 65 outputs a high-level signal output terminal Qd. Moreover, the output signal from output terminal Qd is also applied to edge detection circuit 72 which detects the rising edge of the input signal and furthermore, this edge detected signal from the edge detection circuit 72 is applied to the reset terminal of the main timer 64 through the OR circuit OR1. As a result, main timer 64 is reset via the edge detection circuit 72 and the OR circuit OR1 every time the number of oscillation signals applied by the main oscillator 52 through the voltage divider 62 reaches a predetermined number d.

Furthermore, machine clock generator circuit 66 which together with main timer 64 receives the main oscillation signal from the main oscillator 52 via the frequency divider 62 generates a machine clock signal supplied to computer block 2 using the received oscillation signal.

On the other hand, RC timer 70 is composed of a counter that counts the oscillation signal from the RC oscillator 54 that has passed through frequency divider 68, and if the count reaches predetermined values a, b, c (a<b<c), the RC timer outputs high-level signals according to each of the values of a, b, c from output terminals Qa, Qb and Qc. Then, the output signal from output terminal Qa is applied to edge detection circuit 75 which detects the rising edge of the input signal and furthermore, the edge detection signal from edge detection circuit 74 is applied to AND circuit AND1.

The count amount a described above is so set that the time when RC timer 70 begins to count the oscillation signal received from the RC oscillator 54 via frequency divider 68 up to the rise to the high-level of the output signal from output terminal Qa is longer than the time when main timer 64 begins to count the oscillation signal received from the main oscillator 52 via frequency divider 62 up to the rise to the high-level of the output signal from output terminal Qd.

Next, the output signal from output terminal Qb of RC timer 70 is applied to edge detection circuit 78 which detects the rising edge of the input signal and edge detection circuit 80. Then, edge detection circuit 78 inputs the edge detected signal to the reset terminal R of RS flip-flop FF3 which generates reset signals and edge detection circuit 80 inputs the edge detection signal to AND circuit AND2.

Moreover, RC timer 70 provides an output signal from output terminal Qc via OR circuit OR4 to edge detection circuit 83 which detects rising edges in the input signal and in turn, edge detection circuit 82 supplies an edge detection signal via OR circuit OR6 to reset terminal R of RS flip-flop FF2 which executes sleep control. The other input terminal of OR circuit OR4 receives a command signal for cancelling the sleep command EXWUP received by the microprocessor through an external terminal.

On the other hand, set terminal S of RS flip-flop FF2 for executing sleep control receives a sleep command from computer block 2 and RS flip-flop FF2 provides an oscillation termination signal to the oscillation termination terminal of main oscillator 52 and at the same time, supplies the inverted signal to AND circuit AND2. Then, AND circuit AND2 supplies a signal to reset terminal R of RS flip-flop FF1 and in addition, set terminal S of this RS flip-flop FF1 receives the sleep command from computer block 2 via OR circuit OR5.

In addition, RS flip-flop FF1 provides an output signal for terminating the operation of the machine clock generation circuit 66 together with the AND circuit AND1 receiving the inverted signal. RS flip-flop FF1 supplies the same output signal to OR circuit OR1 and edge detection circuit 84 which detects the falling edges of the input signal. In addition, the inverted output signal from RS flip-flop FF1 and the output signal from the edge detection circuit 74 are applied to AND circuit AND1 which provides an input signal via OR circuit OR3 to set terminal S of RS flip-flop FF3 which is for generating reset signals and at the same time, set terminal S of RS flip-flop FF1 via OR circuit OR5.

On the other hand, the sleep/oscillation stabilization block 50 of this embodiment of the present invention is provided with a low voltage detection circuit 76 which generates a detection signal (high level) when the external electric source voltage applied to the microprocessor falls below a predetermined level. This low voltage detection circuit 76 applies its output signal via OR circuit OR3 to set terminal S of RS flip-flop FF3 which is used fox generating reset signals and at the same time, the low voltage detection circuit 76 provides the same output signal via OR circuit OR6 to reset terminal R of RS flip-flop FF2 which is used for executing sleep control.

Reset terminal R of RC timer 70 receives via OR circuit OR2 each of the outputs of low voltage detection circuit 76, edge detection circuit 84, edge detection circuit 72 and edge detection circuit 82 and the sleep command from the computer block 2. RC timer 70 resets if any of these signals becomes high-level.

For the sleep/oscillation stabilization block 50 constructed above, normally, the output signal of output terminal Qd of main timer 64 becomes high-level at predetermined periods based on a predetermined count d and because this signal resets both main timer 64 and RC timer 70, as shown in the left hand side of the timechart shown in FIGS. 4B and 4C, the count amounts of each of the timers 64, 70 only change periodically. Also, during this state, the machine clock generation circuit 66 provides a machine clock signal to computer block 2.

However, as shown in FIGS. 4C–4E and 4G, during this state, if computer block 2 applies a sleep command, then this sleep command sets RS flip-flops FF1 and FF2, changing their output signals to high-level and at the same time, this sleep command resets RC timer 70 and makes the counting of the oscillation signal provided by RC timer 70 through frequency divider 68 start from "0".

Furthermore, if the output signal from RS flip-flop FF2 is rising, the oscillation of the main oscillator 52 terminates and moreover, the rising edge of the output signal from RS flip-flop FF1 resets main timer 64 and at the same time, it also terminates the operation of the machine clock generation circuit 66.

Therefore, if computer block 2 applies the sleep command, sleep/oscillation stabilization block 50 terminates machine clock output generation and computer block 2 stops operating (in short, it enters a sleep state). During this state, reset signals are not generated, so information stored in the registers inside computer block 2 are preserved.

Next, in this state, in order for RC timer 70 reset by the sleep command to sequentially count the oscillation signal applied by the RC oscillator 54 through frequency divider 68, in accordance with the counting operation, high-level signals are generated sequentially from each of the output terminals Qa, Qb, Qc and RS flip-flop FF2 resets when output terminal Qc of RC timer 70 goes high-level (i.e., the main sleep release time has lapsed) and the main oscillator 52 which was stopped by this output signal resumes its oscillation. For this state, since the RS flip-flop FF2 remains set, the termination of the operation of the machine clock generating circuit 66 stays in effect and no machine clock is generated together with the oscillation of the main oscillator 52.

Also, if the output signal of output terminal Qc of RC timer 70 goes high-level, then because the timer 70 itself is reset at the rising edge, RC timer 70 begins its count of the oscillation signal applied by the RC oscillator 54 through frequency divider 68 from "0".

Next, if the counted amount reaches a value b (i.e., the machine clock sleep release time has lapsed) and the output signal from output terminal Qb goes high-level, then, this time, the RS flip-flop FF2 resets at the rising edge of the signal. As a result, machine clock generation circuit 66 begins operating and the sleep/oscillation stabilization circuit 50 begins generating machine clocks.

On the other hand, if RS flip-flop FF1 resets, then at the falling edge of its output, edge detection circuit 84 generates a detection signal and because this detection signal resets RC timer 70 again, then RC timer 70 starts counting from "0" the oscillation signal supplied by RC timer 70 through frequency divider 68. In addition, if the output signal of RS flip-flop FF1 is at the falling edge, then because main timer 64 is released from the reset state, the main timer 64 begins counting from "0" the oscillation signal applied by the main oscillator 52 through voltage divider 62 in substantial synchronization with RC timer 70. As a result, the sleep/oscillation stabilization block 50 resumes its normal operations.

As described above, in this embodiment, the counted amount of RC timer 70 reaches an amount c together with the lapse of the main sleep release time and after releasing the main oscillator 52 from sleep control, because RC timer, which is reset first, counts the time it takes for the oscillation of the main oscillator 52 to stabilize, then the size of the RC timer is only governed by the count value c and there is no need to increase its size so it can count the sum of b and c. Therefore, the circuit size of RC timer 70 can be reduced to the smallest possible size.

Also, for this embodiment, count value b which corresponds to the machine clock sleep release time is smaller than count value c which corresponds to the main sleep release time and thus, while output terminal Qb generates a high level signal ahead of output terminal Qc, since the reset terminal of RS flip-flop FF1 uses AND circuit AND2 to perform a logical AND of the high-level signal from output terminal Qb and the falling output signal after resetting of RS flip-flop FF2, the high-level signal from output terminal Qc does not reset RS flip-flop FF1 until the signal from the RS flip-flop FF2 resets. Therefore, machine clock generation circuit 66 is released from sleep control only if the main oscillator 52 is released from sleep control.

Next, if the sleep/oscillation stabilization block 50 is functioning normally or is in sleep control or in any state during start control, then, if electric power supplied to the microprocessor is cut off, as shown in FIG. 6F, the low-voltage detection circuit 76 detects that condition and generates a high-level signal. Consequently, as shown in FIGS. 6C-6E, because of the rise of the signal from the low-voltage detection circuit 76, RC timer 70 resets together with the setting of RS flip-flops FF1 and FF3. As a result, RS flip-flop FF3 generates a reset signal while RS flip-flop FF1 also generates a signal that resets main timer 64.

On the other hand, restoring the electric power supply to the microprocessor switches the output of the low-voltage detection circuit 76 to a low-level. RC timer 70 is released from the reset state and RC timer 70 begins counting the oscillation signal applied by RC oscillator 54 through voltage divider 68. Thus, while applying electric power activates main oscillator 52 and makes it oscillate, because the output signal from RS flip-flop RS1 is stopping the operation of the machine clock generation circuit 66, then no machine clock signals are generated.

Next, if the amount counted by RC timer 70 reaches value b, output terminal Qb generates a high-level signal and the rising edge of this signal resets RS flip-flops FF1, FF3. As a result, the output signal from RS flip-flop FF1 goes low-level, main timer 64 is released from the reset state and at the same time, the machine clock generation circuit 66 starts generating machine clock signals. Also, the falling edge of the output signal of RS flip-flop FF1 also resets RC timer 70. In addition, at the same time, RS flip-flop FF3 also stops generating the reset signal. As a result, computer block 2 becomes operational.

Then, in this way, for this embodiment of the present invention, because clocking the time for the oscillation of the main oscillator 52 to stabilize after supplying electric power, in the same way as clocking the time for the main oscillator 52 to stabilize after its release from the sleep state, involves resetting RC timer 70 and making it start the count of the oscillation signal from RC oscillator 54 from "0", RC timer 70 which determines sleep time can be used for clocking the time needed for main oscillator 52 after supplying electric power and thus, there is no need to provide a separate timer.

Figure 5A:
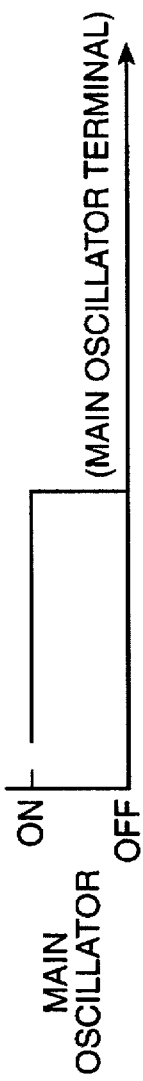
FIGS. 5A–5F are time charts that show the operations of the sleep/oscillation stabilization block according to the first embodiment during the termination of the operation of the main oscillator.
Figure 5B:
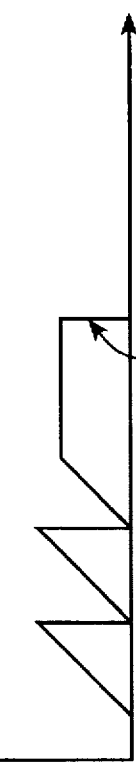
Figure 5C:
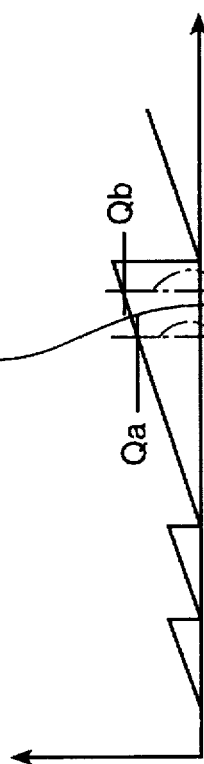
Figure 5D:
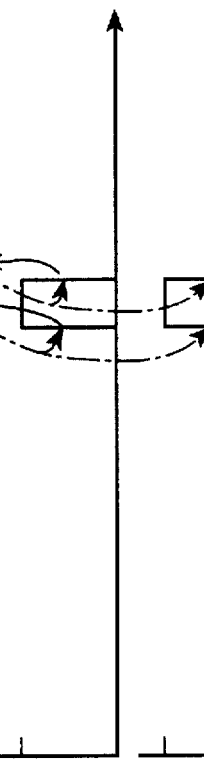
Figure 5E:
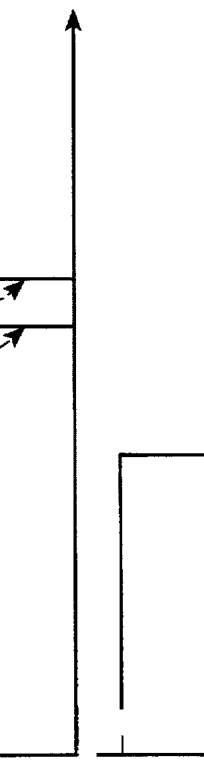
Figure 5F:
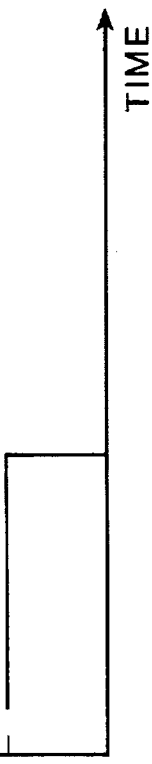

Next, for the sleep/oscillation stabilization circuit 50, when the main oscillator 52 is operating normally, the count value of main timer 64 reaches value d and the main timer 64 and the RC timer 70 are reset before RC timer 70 reaches value a. However, if defects in the manufacture of the oscillating element, malfunctions in the main oscillator 52 or the like prompt the main oscillator 52 to stop its own oscillation, then, as shown in FIGS. 5A-5C, the count value of the main timer 64 is not renewed and RC timer 70 approaches value a. Accordingly, a high-level signal is generated from output terminal Qa and the rising edge of this signal sets RS flip-flops FF1 and FF3. As a result, RS flip-flop FF1 generates a rising edge signal, the main timer 64 resets and the machine clock stops together with RS flip-flop FF3 generating a reset signal. Then, RC timer 70 continues counting operations and when the counted value reaches a value b and output terminal Qb provides a high-level signal, then the rising edge of this signal resets RS flip-flops FF1 and FF3. As a result, output signals of RS flip-flops FF1 and FF3 fall, and the generation of the reset signal from RS flip-flop RS3 is terminated together with the resetting of RC timer 70 using the falling edge of the output signal from RS flip-flop FF1.

Then afterwards, because RC timer 70 begins counting from "0" the oscillation signal provided by the RC generation circuit 54 through frequency divider 68, the counter value is reset again if it reaches value a and repeats the above operations until the oscillation of the main oscillator 52 stabilizes.

Meanwhile, the sleep/oscillation stabilization block 50 shown in FIG. 1 is the circuit when the amount b corresponding to the machine clock sleep release time is smaller than the amount c which corresponds with the main sleep release time. If amount b which corresponds to the machine clock sleep release time gets bigger than amount c which corresponds to the main sleep release time, then the sleep/oscillation stabilization block 50 is constructed as shown in FIG. 7.

Figure 7:
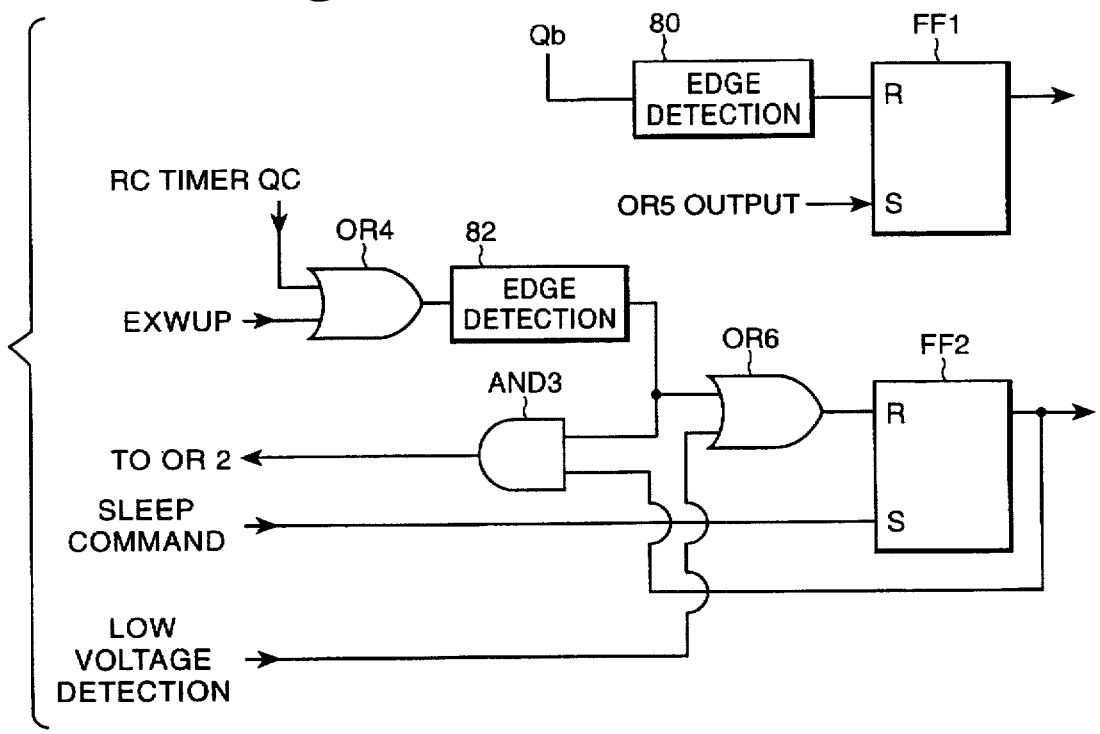
FIG. 7 is a diagram that shows a second embodiment of the sleep/oscillation block.

FIG. 7 focuses on RS flip-flops FF1, FF2, edge detection circuits 80, 82 and OR circuits OR4, OR6 of the sleep/oscillation stabilization block of FIG. 1. As shown in FIG. 7, when the machine clock sleep release time is longer than the main sleep release time, the sleep/oscillation stabilization block 50 can be formed from the sleep/oscillation stabilization block of FIG.1 by omitting AND circuit AND1, and directly applying the output of the edge detection circuit 80 to the reset terminal of RS flip-flop FF1. Also, instead of providing directly the output of edge detection circuit 82 to the OR circuit OR2, an AND circuit AND3 that generates the logical AND of the edge detection circuit 83 output and RS flip-flop RR2 output is provided and the output of this AND circuit AND3 is provided directly to OR circuit OR2. The peripheral circuits are the same as those used in FIG. 1.

In short, for this circuit, output terminal Qc of RC timer 70 provides a signal to AND circuit AND3 via OR circuit OR3 and edge detection circuit 82. Also, because the output of RS flip-flop FF2 is provided to AND circuit AND3, if AND circuit AND 3 receives a high-level signal from output terminal Qc and a high-level signal from RS flip-flop FF2, a high-level output is generated therefrom and RC timer circuit 70 is reset through OR circuit OR2. Therefore, after starting sleep control using the sleep command, if the counted amount of RC timer 7 reaches value c, then since the output signal of RS flip-flop FF2 is high-level, RC timer is reset by the output signal of AND circuit AND3.

In this way, if the output of AND circuit AND3 resets RC timer 70 then, RC timer 70 commences its counting again from "0" and even if a high-level signal is generated from output terminal Qc due to the counting process, since the output of RS flip-flop FF2 is switched to low, then RC timer 70 proceeds counting until its count reaches value b. Then, if the counter value reaches value b and output terminal Qb generates a high-level signal, this signal is detected by the edge detection circuit 80 and the output signal of the edge detection circuit resets RS flip-flop FF1.

Accordingly, if one part of the sleep/oscillation stabilization block 50 shown in FIG. 1 is replaced with the circuit shown in FIG. 7 when the machine clock sleep release time is longer than the main sleep release time, then the main oscillator 52 starts oscillating when the execution time of the sleep control reaches a main sleep release time and after a machine clock sleep release time lapses, the machine clock generation circuit 66 starts operating.

As explained above, for these two embodiments, in the sleep/oscillation stabilization block 50, the computer block provides a sleep command which sets RS flip-flop FF2 and terminates the oscillation of the main oscillator 52 together with setting RS flip-flop FF1 and terminating the operation of machine clock generation circuit 66. As a result, the supply of the machine clock signal to the computer block 2 is stopped and the computer block 2 enters a sleep state.

During the execution of this sleep control, the RC timer through its counting operations clocks the lapsed time and when the counted amount reaches value c (in other words, the sleep control execution has reached a main sleep release time), the main oscillator 52 begins oscillating and furthermore, if the RC timer count amount reaches a value b after resetting (in other words, machine clock sleep release time needed for the oscillation of the main oscillator 52 to stabilize after its activation has lapsed), then the machine clock generation circuit 66 is activated to generate machine clock signals.

Therefore, according to this embodiment of the present invention, the computer block 2 is reliably activated after a predetermined amount of time (main sleep release time+ machine clock sleep release time) even after starting sleep control. For example, if the process being controlled by computer block 2 operates erroneously during sleep control or if the computer block 2 left the driving switch of the process on as sleep control began, then, after a predetermined period of time has lapsed, the computer block 2 terminates the erroneous operation of such a process and thus, the reliability of the microprocessor improves.

Also, when resuming operations after sleep control, because machine clock signals are generated after a main sleep release time has lapsed after activating the main oscillator 52, machine clock signals are supplied to the computer block after the oscillation operation of the main oscillator 52 stabilizes. Thus, the computer block is operated using stable machine clock signals and erroneous control caused by unstable machine clock signals is prevented.

In addition, RC timer 70 is first reset before clocking the time for the oscillation of the main oscillator 52 to stabilize after activating the latter. Accordingly, the RC timer 70 is reduced to the smallest possible size.

Furthermore, because an RC oscillator 54 which is more reliable than the main oscillator 52 that uses an oscillating element is used for sleep control, highly reliable sleep control is implemented. Also, because the RC oscillator 54 supplies the RC timer 70 with stable oscillation signals immediately after supplying electric power, the time it takes for the oscillation of the main oscillator 52 to stabilize after supplying electric power therein is always measured precisely. Moreover, the highly-reliable RC oscillator 54 monitors the system for irregularities like malfunctions of the main oscillator 52.

Also, for the sleep/oscillation stabilization block 50 of this embodiment of the present invention, because RS flip-flop FF2 resets even if the external terminal applies command signal EXWUP which is for releasing sleep control, then in the same way when the count value of RC timer 70 reaches value c and the output of output terminal Qc becomes high-level, the main oscillator 52 begins oscillation operations first, and then, the machine clock generation circuit 66 starts generating machine clock signals after a predetermined amount of time has lapsed.

Therefore, according to this embodiment of the present invention, the sleep command can be released through an external command and moreover, the computer block 2 operates using a stable machine clock immediately after releasing the sleep command.

In addition, for the sleep/oscillation stabilization block 50 of this embodiment of the present invention, the termination of the main oscillator 52 is determined using the count values of RC timer 70 and main timer 64 and if the main oscillator 52 is found to be terminated, the computer block 2 receives a reset signal.

Accordingly, for example, when the computer block is driving a process, if the oscillation of the main oscillator 52 stops and the computer block 2 cannot be supplied with machine clocks anymore, then computer block 2 resets and stops generating signals.

Therefore, because of the termination of the oscillation of the main oscillator 52, the process which receives control signals from the computer block 2 for its operation does not continue its erroneous operation and thus, the reliability of the output signal generated by the computer block 2 improves.

Furthermore, for the sleep/oscillation stabilization block 50 of the foregoing embodiment of the present invention, the RS flip-flop continues generating the reset signal while the machine clock signal generated by the machine clock generation circuit 66 is continuously blocked during the time period starting from the application of electric power which starts the oscillation operations of the main oscillator 52 up to the time the count value of RC timer reaches the value b. As a result, after the main oscillator 52 starts oscillating after the application of electric power, the operations of the computer block 2 are stopped until the oscillation signal from the main oscillator 52 stabilizes and also, the operation of the machine block using an unstable clock after applying electric power is prevented.

While main timer 64 and RC timer 70 are used for monitoring the operational state of the main oscillator 52, there is no absolute need to use main timer 64 because the termination of the oscillation of the main oscillator 52 can also be detected by, for example, directly resetting RC timer 70 using the oscillation signal from the main oscillator 52 or the frequency-divided oscillator from the frequency divider 52.

Also, for this embodiment, while the RC timer 70 monitors the operational status of the main oscillator 52, the execution time of sleep control, the time it takes for the oscillation of the main oscillator 52 to stabilize or the like, there is no absolute need to use RC timer 70. For example, the oscillation signal from RC oscillator 54 can also be used to clock the times for monitoring the above.

Also, while the RC oscillator 54 and RC timer 70 are always in operation for this embodiment, it is possible that they function only during the execution of sleep control or during sleep control execution and when electric power is supplied. Then, if RC oscillator 54 and RC timer operate only when executing sleep control, the timing for restoring the main oscillator 52 and the machine clock generation circuit 66 after sleep control can be optimally planned if the main sleep release time and the machine clock sleep release time during sleep control execution are clocked. Furthermore, if RC oscillator 54 and RC timer 70 are also operated when electric power is supplied, the machine clock is stabilized after supplying electric power.

What is claimed is:

1. A driving circuit for a microprocessor comprising:

a main oscillator generating a main oscillation signal;

machine clock generation means for generating a machine clock signal based on said main oscillation signal;

main sleep control means for selectively controlling oscillation of said main oscillator responsive to a sleep command;

machine clock sleep control means for selectively providing said machine clock signal to said microprocessor;

a sleep period timer measuring a time period elapsing since said main sleep control means has terminated oscillation of said main oscillator;

main sleep control termination means for causing said main sleep control means to enable oscillation of said main oscillator when said time period measured by said sleep period timer is at least as long as a main sleep release time; and machine clock sleep control termination means for causing said machine clock sleep control means to provide said machine clock signal to said microprocessor when said time period measured by said sleep period timer is at least as long as a machine clock sleep release time, said machine clock sleep release time being a time period necessary for oscillation of said main oscillator to stabilize.

2. The driving circuit of claim 1, said machine clock sleep control termination means including detecting means for detecting whether said main oscillator has been enabled and said time period measured by said sleep period timer is at least as large as a clock sleep release time.

3. The circuit of claim 1, further comprising:

power supply detection means for resetting said sleep period timer when power is applied to said circuit; and operation termination means for causing said machine clock sleep control means to terminate said machine clock output from a time when power is applied to said microprocessor to a time when said sleep period timer measures a time period at least as long as a machine clock sleep release time.

4. The circuit of claim 1, further comprising:

power supply detection means for resetting said sleep period timer when power is applied to said circuit; and operation termination means for generating a reset signal to terminate operation of said microprocessor from a time when power is applied to said microprocessor to a time when said sleep period timer measures a time period at least as long as a machine clock sleep release time.

5. The circuit of claim 1, further comprising:

main oscillation irregularity detection means for detecting irregularities in said main oscillation signal; and resetting means for generating a reset signal to reset said microprocessor responsive to detection of an irregularity by said main oscillation irregularity detection means.

6. The circuit of claim 1, said sleep period timer including a second oscillator for generating a sleep period oscillation signal.

7. The circuit of claim 6, wherein said second oscillator is an RC oscillator.

8. The circuit of claim 1, further comprising:

an input terminal capable of receiving a sleep control release signal;

wherein said main sleep control termination means enables oscillation of said main oscillator responsive to said sleep control release signal.

9. A driving circuit for a microprocessor comprising:

a main oscillator generating a main oscillation signal;

machine clock generation means for generating a machine clock signal based on said main oscillation signal;

main sleep control means for selectively controlling oscillation of said main oscillator responsive to a sleep command;

machine clock sleep control means for selectively providing said machine clock signal to said microprocessor;

sleep period timing means for measuring a time period elapsing since said main sleep control means has terminated oscillation of said main oscillator and, when said time period is at least as long as a main sleep release time, resetting said time period when said main sleep control means terminates oscillation of said main oscillator;

main sleep control termination means for causing said main sleep control means to enable oscillation of said main oscillator when said time period measured by said sleep period timer is at least as long as a main sleep release time; and machine clock sleep control termination means for causing said machine clock sleep control means to provide said machine clock signal to said microprocessor when said time period measured by said sleep period timer is at least as long as a machine clock sleep release time, said machine clock sleep release time being a time period necessary for oscillation of said main oscillator to stabilize.

10. The driving circuit of claim 9, said machine clock sleep control termination means including detecting means for detecting whether said main oscillator has been enabled and said time period measured by said sleep period timer is at least as large as a clock sleep release time.

11. The circuit of claim 9, further comprising:

power supply detection means for resetting said sleep period timer when power is applied to said circuit; and operation termination means for causing said machine clock sleep control means to terminate said machine clock output from a time when power is applied to said microprocessor to a time when said sleep period timer measures a time period at least as long as a machine clock sleep release time.

12. The circuit of claim 9, further comprising:

power supply detection means for resetting said sleep period timer when power is applied to said circuit; and operation termination means for generating a reset signal to terminate operation of said microprocessor from a time when power is applied to said microprocessor to a time when said sleep period timer measures a time period at least as long as a machine clock sleep release time.

13. The circuit of claim 9, further comprising:

main oscillation irregularity detection means for detecting irregularities in said main oscillation signal; and resetting means for generating a reset signal to reset said microprocessor responsive to detection of an irregularity by said main oscillation irregularity detection means.

14. The circuit of claim 9, said sleep period timer including a second oscillator for generating a sleep period oscillation signal.

15. The circuit of claim 14, wherein said second oscillator is an RC oscillator.

16. The circuit of claim 9, further comprising:

an input terminal capable of receiving a sleep control release signal;

wherein said main sleep control termination means enables oscillation of said main oscillator responsive to said sleep control release signal.

\* \* \* \* \*